(12) United States Patent
Nishi et al.

(10) Patent No.: US 9,327,611 B2
(45) Date of Patent: May 3, 2016

(54) TEMPERATURE ELEVATING APPARATUS OF SECONDARY BATTERY AND VEHICLE EQUIPPED WITH SAME

(75) Inventors: Yuji Nishi, Nagoya (JP); Hidenori Takahashi, Okazaki (JP); Masatoshi Tazawa, Okazaki (JP); Masanobu Matsusaka, Handa (JP); Makoto Ishikura, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 910 days.

(21) Appl. No.: 13/260,077

(22) PCT Filed: Jul. 8, 2009

(86) PCT No.: PCT/JP2009/062403
§ 371 (c)(1),
(2), (4) Date: Sep. 23, 2011

(87) PCT Pub. No.: WO2011/004464
PCT Pub. Date: Jan. 13, 2011

(65) Prior Publication Data
US 2012/0021263 A1    Jan. 26, 2012

(51) Int. Cl.
*B60L 11/18*    (2006.01)
*H01M 10/625*    (2014.01)
(Continued)

(52) U.S. Cl.
CPC ......... *B60L 11/1875* (2013.01); *B60L 11/1851* (2013.01); *H01M 10/615* (2015.04); *H01M 10/625* (2015.04); *H01M 10/637* (2015.04); *H01M 10/657* (2015.04); *H01M 2/345* (2013.01); *H01M 2/348* (2013.01); *H01M 10/425* (2013.01); *H01M 10/5004* (2013.01); *H01M 10/5006* (2013.01); *H01M 2200/10* (2013.01); *Y02T 10/705* (2013.01); *Y02T 10/7005* (2013.01); *Y02T 10/7011* (2013.01)

(58) Field of Classification Search
None
See application file for complete search history.

(56) References Cited

U.S. PATENT DOCUMENTS

| 4,554,500 A | 11/1985 | Sokira |
| 5,362,942 A | 11/1994 | Vanderslice, Jr. et al. |

(Continued)

FOREIGN PATENT DOCUMENTS

| CN | 2261640 Y | 9/1997 |
| CN | 101364768 A | 2/2009 |

(Continued)

OTHER PUBLICATIONS

Yaguchi (JP, 2007-012568) (a raw machine translation) (Claims, Detailed Description & Drawings).*

(Continued)

*Primary Examiner* — Edu E Enin-Okut
*Assistant Examiner* — Carmen Lyles-Irving
(74) *Attorney, Agent, or Firm* — Sughrue Mion, PLLC

(57) ABSTRACT

A temperature elevating apparatus of a secondary battery includes a ripple generator and a controller. Ripple generator is connected to secondary battery, and is configured to actively generate ripple current of a predetermined frequency in secondary battery. Controller controls ripple generator to elevate a temperature of the secondary battery by generating ripple current in secondary battery. Here, the predetermined frequency is set to be a frequency in a frequency region where an absolute value of an impedance of secondary battery relatively decreases based on frequency characteristics of the impedance of secondary battery.

10 Claims, 15 Drawing Sheets

(51) Int. Cl.
*H01M 10/637* (2014.01)
*H01M 10/657* (2014.01)
*H01M 2/34* (2006.01)
*H01M 10/615* (2014.01)
*H01M 10/613* (2014.01)
*H01M 10/42* (2006.01)

(56) References Cited

U.S. PATENT DOCUMENTS

| | | | |
|---|---|---|---|
| 6,078,163 | A | 6/2000 | Horie et al. |
| 6,271,648 | B1 | 8/2001 | Miller |
| 6,408,968 | B1 | 6/2002 | Wakashiro et al. |
| 8,248,033 | B2 * | 8/2012 | Nishi et al. .............. 320/132 |
| 2003/0102845 | A1 | 6/2003 | Aker et al. |
| 2004/0076872 | A1 * | 4/2004 | Kinoshita et al. ............ 429/61 |
| 2005/0001597 | A1 * | 1/2005 | Walters et al. ............ 323/222 |
| 2006/0284614 | A1 | 12/2006 | Kim et al. |
| 2007/0223259 | A1 * | 9/2007 | Nozaki et al. .............. 363/50 |
| 2009/0039853 | A1 | 2/2009 | Omi |
| 2009/0146588 | A1 * | 6/2009 | Okamura ................ 318/139 |
| 2010/0019728 | A1 | 1/2010 | Ichikawa et al. |

FOREIGN PATENT DOCUMENTS

| | | |
|---|---|---|
| DE | 100 40 198 A1 | 3/2001 |
| EP | 1 286 459 A1 | 2/2003 |
| JP | 9-259937 A | 10/1997 |
| JP | 11-162526 A | 6/1999 |
| JP | 11-329516 A | 11/1999 |
| JP | 2006-6073 A | 1/2006 |
| JP | 2006-507790 A | 3/2006 |
| JP | 2007-12568 A | 1/2007 |
| JP | 2008-61487 A | 3/2008 |
| JP | 2008-109778 A | 5/2008 |
| JP | 2008-117565 A | 5/2008 |
| JP | 2008-175556 A | 7/2008 |
| JP | 2008-547365 A | 12/2008 |
| JP | 2009-142069 A | 6/2009 |
| WO | 2004/049540 A2 | 6/2004 |
| WO | 2008/099329 A1 | 8/2008 |

OTHER PUBLICATIONS

Notice of Allowance for U.S. Appl. No. 13/382,672 mailed Apr. 16, 2012.

* cited by examiner

TEMPERATURE ELEVATING APPARATUS OF SECONDARY BATTERY AND VEHICLE EQUIPPED WITH SAME

TECHNICAL FIELD

The present invention relates to a temperature elevating apparatus of a secondary battery and a vehicle equipped with the same, and in particular, to a technique of elevating temperature of a secondary battery utilizing heat generation by an internal resistance of a secondary battery.

BACKGROUND ART

Generally, in a secondary battery represented by a lithium ion battery, charge-discharge characteristics deteriorate when a temperature decreases. For example, in a lithium ion battery, when it is charged under a low temperature, deposition of lithium (Li) occurs in a negative electrode, and deterioration in performance such as a reduction of a capacity of the battery occurs. Therefore, when the temperature of a battery is low, it is necessary to rapidly elevate the temperature of the battery.

Japanese Patent Laying-Open No. 11-329516 (Patent literature 1) discloses a temperature elevating apparatus of a battery. In this temperature elevating apparatus, a series circuit made up of an inductor, a capacitor and an AC source is disposed on each end of the battery to form a resonance circuit. Then, by generating AC voltage of the resonance frequency of the resonance circuit from the AC source, a temperature of the battery is elevated.

In this temperature elevating apparatus, electric power is consumed mostly by the internal resistance of the battery at the time of the resonance, and the temperature of the battery is elevated by self heat generation. Therefore, according to this temperature elevating apparatus, it is alleged that the temperature of the battery can be elevated efficiently with minimum consumption of the electric power (see Patent literature 1).

CITATION LIST

Patent Literature

PTL 1: Japanese Patent Laying-Open No. 11-329516
PTL 2: Japanese Patent Laying-Open No 2007-12568

SUMMARY OF INVENTION

Technical Problem

In a secondary battery, generally, it is required to keep the upper and lower limit voltages of the battery from the view points of safety and durability, however, since an impedance of the battery increases under a low temperature compared with that at a normal temperature, the increased impedance of the battery under an extremely low temperature, in particular, can lead such a situation that it is impossible to make an electric current that is sufficient for heat generation flow inside the battery while keeping the upper and lower limit voltages of the battery.

In the temperature elevating apparatus disclosed in the above Japanese Patent Laying-Open No. 11-329516, since it is necessary to additionally provide a resonance circuit made up of an inductor, a capacitor and a AC source, miniaturization and a cost reduction of the apparatus are also inhibited.

The present invention was devised for solving the above problems, and it is an object of the present invention to provide a temperature elevating apparatus of a secondary battery capable of effectively elevating a temperature of a secondary battery by allowing effective heat generation in the secondary battery from inside, and a vehicle equipped with the same.

It is another object of the present invention to provide a temperature elevating apparatus of a secondary battery capable of effectively elevating a temperature of a secondary battery by effectively generating heat in the secondary battery from inside without inhibiting miniaturization and a cost reduction of the apparatus, and a vehicle equipped with the same.

Solution to Problem

According to the present invention, a temperature elevating apparatus of a secondary battery includes a ripple generator and a controller. The ripple generator is connected to the secondary battery, and is configured to actively generate a ripple current of a predetermined frequency in the secondary battery. The controller controls the ripple generator so that a temperature of the secondary battery is elevated by generating the ripple current in the secondary battery. Here, the predetermined frequency is set at a frequency in a frequency region where an absolute value of an impedance of the secondary battery relatively decreases, based on frequency characteristics of the impedance of the secondary battery.

Preferably, the ripple generator is a chopper-type booster configured to be able to boost an output voltage to a voltage of the secondary battery or higher.

Preferably, the controller sets a switching frequency of the booster at the predetermined frequency when the temperature of the secondary battery is requested to be elevated.

Preferably, the controller sets a switching frequency of the booster at a value lower than that at the time when the temperature of the secondary battery is not elevated when the temperature of the secondary battery is requested to be elevated.

Preferably, the booster includes a first and a second switching elements, and a reactor. The first and the second switching elements are connected serially between each a pair of voltage output lines. The reactor has a predetermined inductance, and is connected between a connection node of the first and second switching elements and a positive electrode of the secondary battery. When the temperature of the secondary battery is requested to be elevated, the controller sets a switching frequency of the first and second switching elements so that the ripple current is maximized within the range not exceeding a maximum current amount of the secondary battery determined for each frequency of the ripple current by the frequency characteristics of the impedance of the secondary battery and a voltage restriction of the secondary battery.

Preferably, the booster includes a first and a second switching elements, and a reactor. The first and the second switching elements are connected serially between each of a pair of voltage output lines. The reactor has a predetermined inductance, and is connected between a connection node of the first and second switching elements and a positive electrode of the secondary battery. Accordingly, an inductance of the reactor is set so that a calorific value of the secondary battery determined for each frequency of the ripple current by the frequency characteristics of the impedance of the secondary battery and a voltage restriction of the secondary battery is maximized.

Preferably, the predetermined frequency is set at approximately 1 kHz based on the frequency characteristics of the impedance of the secondary battery.

Preferably, the secondary battery is a lithium ion battery. The predetermined frequency is set to be higher than a frequency corresponding to a time constant determined by a deposition resistance of a negative electrode and an electric double layer capacity of the negative electrode at the time when a charging current flows in the lithium ion battery.

Preferably, the secondary battery is a lithium ion battery. The controller controls the ripple generator so that a ripple current in which an average value of the ripple current is offset to the discharging side of the lithium ion battery is generated in the secondary battery.

According to the present invention, a temperature elevating apparatus of a secondary battery includes a ripple generator and a controller. The ripple generator is connected to the secondary battery, and is configured to actively generate a ripple current of a predetermined frequency in the secondary battery. The controller controls the ripple generator in such manner that the temperature of the secondary battery is elevated by generating the ripple current in the secondary battery. The ripple generator is a chopper-type booster configured to be able to boost an output voltage to a voltage of the secondary battery or higher. The booster includes a first and a second switching elements, a first and a second reactors, and a connector. The first and the second switching elements are connected serially between each of a pair of voltage output lines. The first reactor is provided between a connection node of the first and second switching elements and a positive electrode of the secondary battery. The second reactor is provided in parallel with the first reactor, and has a smaller inductance than the first reactor. The connector connects the second reactor, in place of the first reactor or in addition to the first reactor, between the connection node and a positive electrode of the secondary battery when the temperature of the secondary battery is requested to be elevated.

According to the present invention, a vehicle includes a secondary battery for storing electric power for vehicle traveling, and any one of the above temperature elevating apparatuses of the secondary battery that elevates a temperature of the secondary battery when the temperature of the secondary battery is requested to be elevated.

Advantageous Effects of Invention

In the present invention, a temperature of the secondary battery is elevated from inside by actively generating a ripple current of a predetermined frequency in the secondary battery by a ripple generator. In particular, under an extremely low temperature, such a situation can arise that it is impossible to make an electric current that is sufficient for heat generation flow inside the battery while keeping the upper and lower limit voltages of the battery due to the increased impedance of the battery. However, in the present invention, since a frequency of the ripple current is set at a frequency in a frequency region where an absolute value of the impedance relative decreases based on the frequency characteristics of the impedance of the secondary battery, it is possible to make a current sufficient for heat generation flow inside the battery while keeping the upper and the lower limit voltages of the battery even under an extremely low temperature. Therefore, according to the present invention, it is possible to effectively elevate a temperature of the secondary battery by effectively generating heat in the secondary battery.

DESCRIPTION OF EMBODIMENTS

Figure 1:
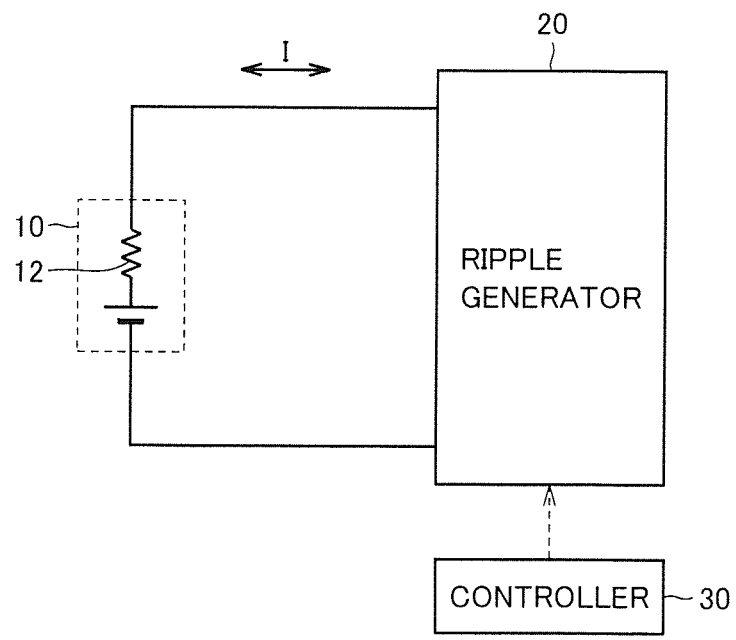
FIG. 1 is a general configuration view of a temperature elevating apparatus of a secondary battery according to a first embodiment of the present invention.

In the following, embodiments of the present invention will be specifically described referring to drawings. The identical or corresponding part in drawings is denoted by the same reference numeral, and description thereof will not be repeated.

First Embodiment

FIG. 1 is a general configuration view of a temperature elevating apparatus of a secondary battery according to a first embodiment of the present invention. Referring to FIG. 1, the temperature elevating apparatus has a ripple generator 20 and a controller 30. Ripple generator 20 is connected to a secondary battery 10.

Secondary battery 10 is a re-chargeable battery represented by a lithium ion battery, a nickel hydrogen battery and the like. Secondary battery 10 includes an internal resistance 12. As will be described later, internal resistance 12 has a temperature dependency, and largely varies according to the frequency of the current flowing in the battery.

Ripple generator 20 is controlled by controller 30 and actively generates a ripple current I of a predetermined frequency in secondary battery 10. It is possible to generate ripple current I in secondary battery 10, for example, by turning ON/OFF a semiconductor switching element for electric power that forms ripple generator 20. A circuit configuration of ripple generator 20 will be described later by way of an example.

Controller 30 controls ripple generator 20 in such a manner that a temperature of secondary battery 10 is elevated from inside by generating ripple current I in secondary battery 10. Here, controller 30 controls ripple generator 20 in such a manner that ripple current I of a frequency region wherein an absolute value of an impedance of secondary battery 10 relatively decreases, is generated in secondary battery 10 based on the frequency characteristics of the impedance of secondary battery 10.

In the following, a concept of the technique of effectively elevating the temperature of secondary battery 10 by actively generating ripple current I in secondary battery 10 (hereinafter, this temperature elevation is also called "ripple temperature elevation") will be specifically described.

Figure 2:
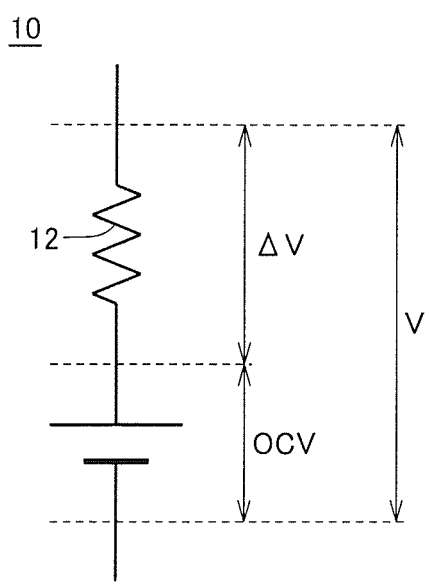
FIG. 2 is a view showing the breakdown of a voltage of a secondary battery.

FIG. 2 is a view showing breakdown of a voltage of secondary battery 10. In this FIG. 2, for simplification, only a real part is assumed for an internal resistance and imaginary parts by L, C and the like are not assumed. Referring to FIG. 2, a voltage V occurring between terminals of secondary battery 10 is open circuit voltage OCV in consideration of voltage ΔV occurring in internal resistance 12 at the time of applying current. Concretely, when a charging current flows, V=OCV+ΔV, and when a discharge current flows, V=OCV−ΔV (ΔV>0).

Taking resistance value of internal resistance 12 as R, a calorific value Q when current I flows in secondary battery 10 can be represented by the following formulas.

$$Q = I^2 \times R \quad (1)$$
$$= I \times \Delta V \quad (2)$$
$$= \Delta V^2 / R \quad (3)$$

These formulas (1) to (3) are equivalent. According to Formula (1), it seems that temperature of secondary battery 10 can be effectively elevated by increasing ripple current I generated using ripple generator 20. However, actually, it is required to keep the upper and the lower limit voltages from the view points of safety and durability for voltage V of the secondary battery as described above. In particular, under an extremely low temperature, since voltage ΔV increases as resistance value R of internal resistance 12 increases, such a situation can arises that it is impossible to allow ripple current I sufficient for heat generation to flow while keeping voltage V of secondary battery 10 within the upper and the lower limits.

That is, under a low temperature at which resistance value R of internal resistance 12 increases (particularly, under an extremely low temperature), secondary battery 10 cannot allow ripple current I to flow therein due to the restriction by voltage ΔV, and thus a temperature of secondary battery 10 cannot be effectively elevated. Accordingly, in the present invention, focusing on Formula (3) and the frequency characteristics of the impedance of secondary battery 10, a ripple current of the frequency region where an absolute value of the impedance (resistance value R of internal resistance 12) of secondary battery 10 is relatively smaller than that in other frequency region is generated by ripple generator 20. As a result of this, calorific value Q of secondary battery 10 increases, and the temperature of secondary battery 10 can be effectively elevated.

Figure 3:
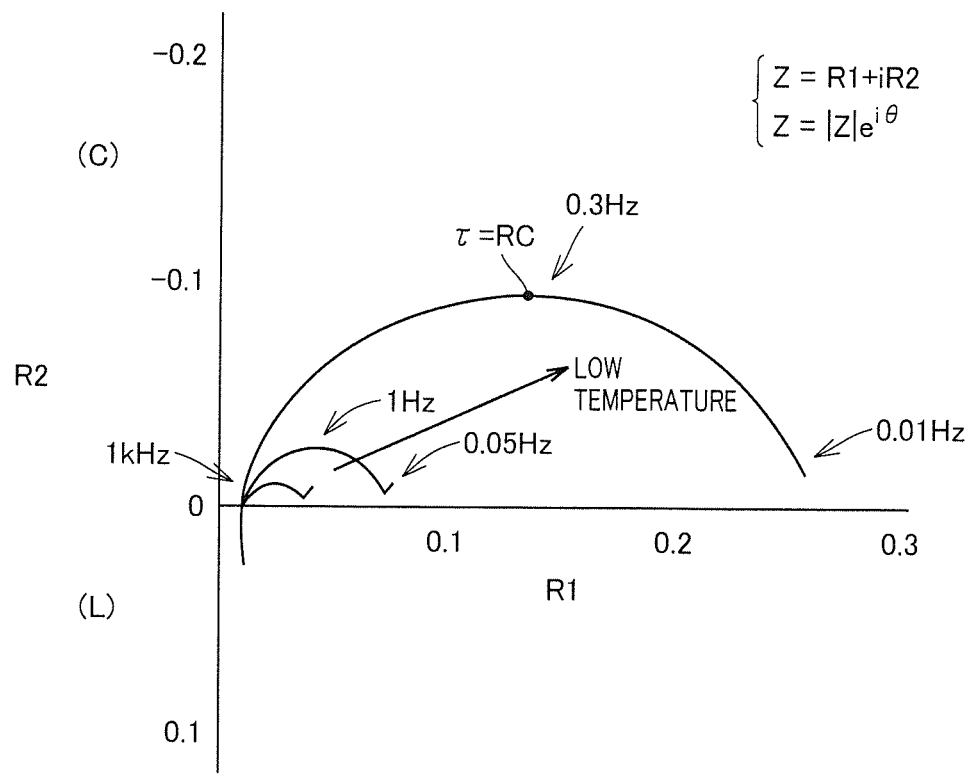
FIG. 3 is a Nyquist diagram showing impedance characteristics of a secondary battery.

FIG. 3 is a Nyquist diagram showing impedance characteristics of secondary battery 10. As an approach for analyzing electric characteristics of a secondary battery, an electrochemical impedance spectroscopy (also called "EIS") is known, and this Nyquist diagram represents impedance characteristics of secondary battery 10 using EIS on a complex plane.

Referring to FIG. 3, an impedance Z of secondary battery 10 can be represented by the following formulas.

$$Z = R1 + iR2 \quad (4)$$
$$= |Z|e^{i\theta} \quad (5)$$

In FIG. 3, the horizontal axis represents a real component (R1) and the vertical axis represents an imaginary component (R2). As for imaginary component (R2), the upper direction is minus and the low direction is plus in FIG. 3. Distance from the origin represents an absolute value |Z| showing magnitude of impedance Z, and angle formed with the horizontal axis (actual axis) represents a phase θ of impedance Z.

Figure 4:
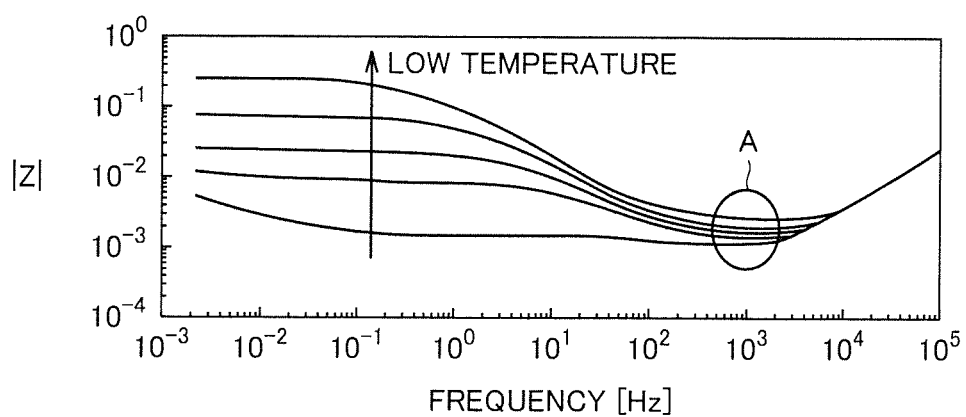
FIG. 4 is a Bode diagram showing impedance characteristics (absolute value) of a secondary battery.
Figure 5:
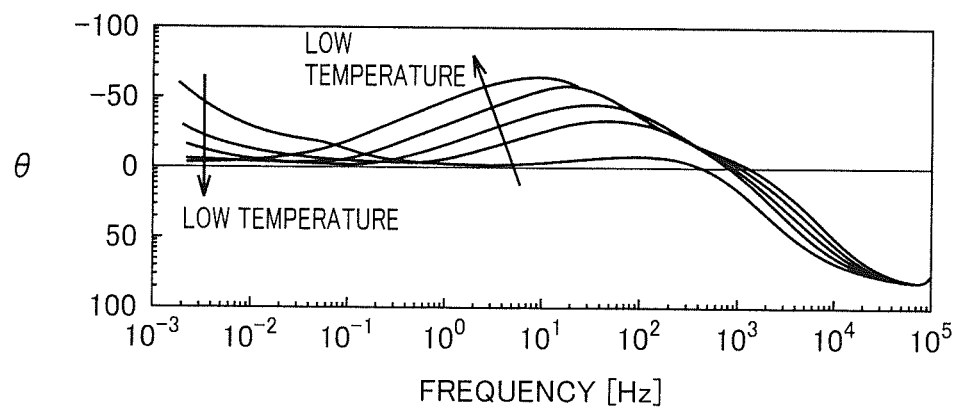
FIG. 5 is a Bode diagram showing impedance characteristics (phase) of a secondary battery.

FIGS. 4 and 5 are Bode diagrams showing impedance characteristics of secondary battery 10. Also these Bode diagrams show impedance characteristics of secondary battery 10 using EIS. FIG. 4 represents frequency characteristics of absolute value |Z| of impedance Z, and FIG. 5 represents frequency characteristics of phase θ of impedance Z.

In FIGS. 4 and 5, the horizontal axis represents logarithm frequency of AC current (ripple current) to be generated by secondary battery 10. The vertical axis represents logarithm of absolute value |Z| of impedance Z in FIG. 4, and phase θ of impedance Z in FIG. 5.

As shown in FIGS. 3 and 4, under a low temperature where the temperature of secondary battery 10 is required to be elevated, absolute value |Z| of impedance Z increases compared with that not under a low temperature, however, such increase is significant only when a frequency of the ripple current is low frequency. In particular, when the frequency is around 1 kHz, absolute value |Z| of impedance Z is smaller compared with that for other frequency region, and it is as high as about 3 times that not under a low temperature (under normal temperature) even under an extremely low temperature (A part in FIG. 4). As shown in FIG. 5, at this frequency region, phase θ of impedance Z is also near zero, the power factor is also 1 and thus the efficiency is good.

In the first embodiment, based on the frequency characteristics of the impedance of secondary battery 10, ripple generator 20 is made generate ripple current in a frequency region where absolute value |Z| of impedance Z of secondary battery 10 relatively decreases (approximately 1 kHz in the first embodiment). As a result, it is possible to make ripple current effectively flow in secondary battery 10 while keeping the restriction of voltage ΔV occurring in internal resistance 12 of secondary battery 10, and as a result, a temperature of secondary battery 10 is effectively elevated.

Figure 6:
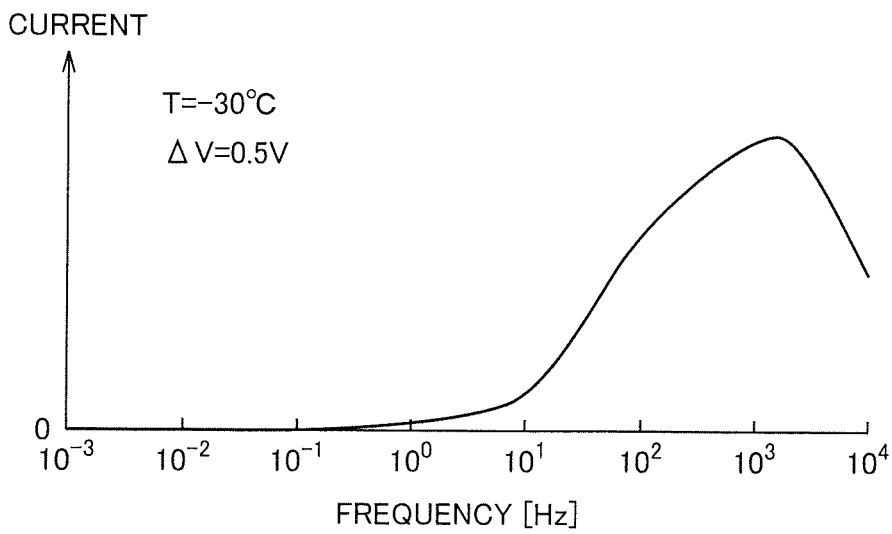
FIG. 6 is a diagram showing a peak value of a ripple current that can be made flow in a secondary battery under an extremely low temperature under a restriction condition of the voltage occurring in the internal resistance.

FIG. 6 is a diagram showing peak value I0 of ripple current that can be made flow in secondary battery 10 under an extremely low temperature under a restriction condition of voltage ΔV occurring in internal resistance 12 of secondary battery 10. Referring to FIG. 6, the horizontal axis represents the frequency of the ripple current, and the vertical axis represents peak value I0 of the ripple current (assuming sine wave) that second battery 10 can allow to flow under a restriction condition of voltage ΔV. Here, as one example, the case where voltage ΔV=0.5 V, and temperature of secondary battery 10 T=−30° C. (extremely low temperature) is shown.

As shown in FIG. 6, in a frequency region where an absolute value of the impedance of secondary battery 10 is relatively small (around 1 kHz), a current that can be made flow in secondary battery 10 increases. In the case of a low frequency or a direct current, when a restriction condition of voltage ΔV=0.5 V is given, it is impossible to allow little current to flow in secondary battery 10, and impossible to elevate a temperature of the secondary battery.

Figure 7:
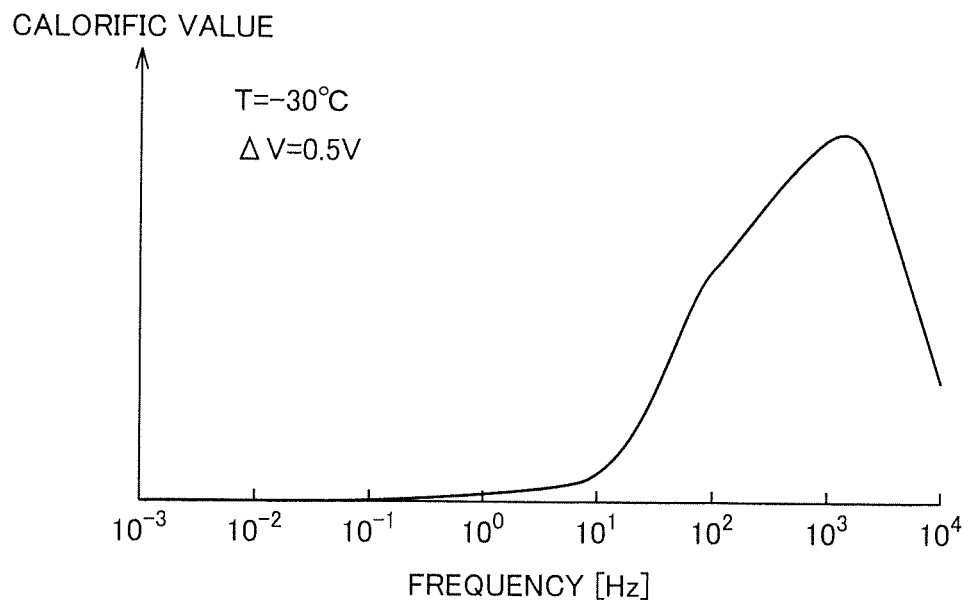
FIG. 7 is a diagram showing an average calorific value that can be generated in a secondary battery under an extremely low temperature under a restriction condition of the voltage occurring in the internal resistance.

FIG. 7 is a diagram showing an average calorific value that can be generated in secondary battery 10 under an extremely low temperature under a restriction condition of voltage ΔV occurring in internal resistance 12 of secondary battery 10. Referring to FIG. 7, the horizontal axis represents the frequency of the ripple current, and the vertical axis represents the average calorific value of secondary battery 10 in one cycle of ripple. Also herein, the case where voltage ΔV=0.5 V, and a temperature of secondary battery 10 T=−30° C. (extremely low temperature) is shown as one example.

As shown in FIG. 7, in a frequency region where an absolute value of the impedance of secondary battery 10 is relatively small (around 1 kHz), the calorific value of secondary battery 10 increases. In the case of a low frequency or a direct current, when a restriction condition of voltage ΔV=0.5 V is given, it is impossible to allow little current to flow in secondary battery 10, and impossible to elevate the temperature of the secondary battery.

Figure 8:
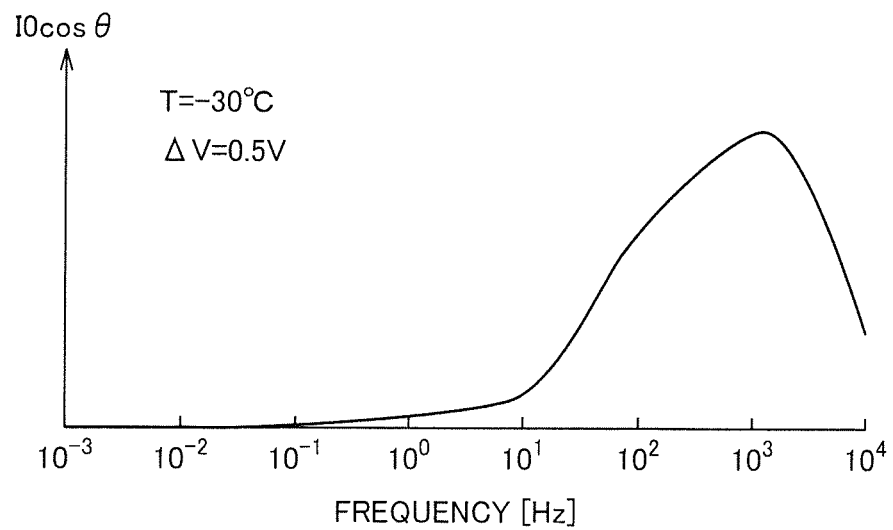
FIG. 8 is a diagram showing magnitude of $I0 \cos \theta$ under an extremely low temperature under a restriction condition of the voltage occurring in the internal resistance.

FIG. 8 is a diagram showing magnitude of I0 cos θ under an extremely low temperature under a restriction condition of voltage ΔV occurring in internal resistance 12 of secondary battery 10. Here, since calorific value Q is proportional to I0×|ΔV|×cos θ, when voltage ΔV is constant, I0 cos θ is proportional to calorific value Q. Also herein, the case where voltage ΔV=0.5 V, and a temperature of secondary battery 10 T=−30° C. (extremely low temperature) is shown as one example.

Referring to FIG. 8, in a frequency region where an absolute value of the impedance of secondary battery 10 is relatively small (around 1 kHz), Jocose increases. Therefore, by generating a ripple current of the frequency at which I0 cos θ is maximum, in secondary battery 10, it is possible to maximize calorific value Q of secondary battery 10.

In this manner, based on frequency characteristics of impedance of secondary battery 10, ripple generator 20 is caused to generate a ripple current in the frequency region where an absolute value of the impedance of secondary battery 10 relatively decreases (for example, around 1 kHz in the first embodiment). As a result, it is possible to increase calorific value Q of secondary battery 10, and to effectively elevate the temperature of secondary battery 10.

Next, one examples of concrete configurations of ripple generator 20 and controller 30 shown in FIG. 1 will be described.

Figure 9:
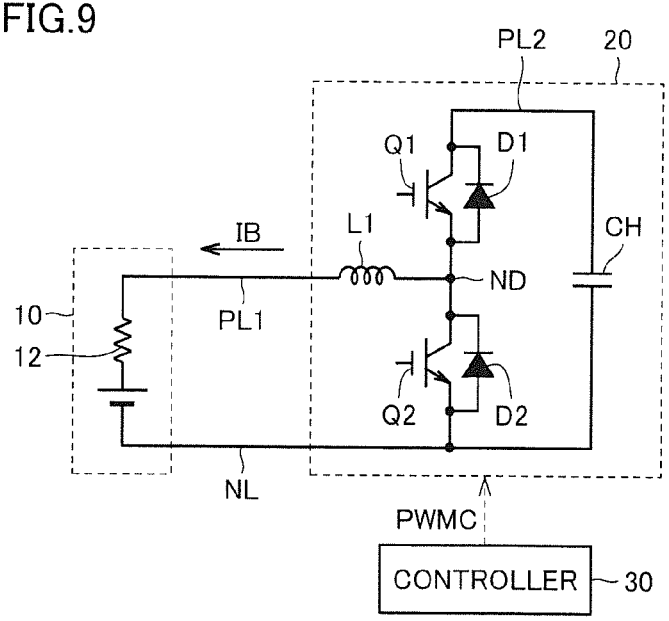
FIG. 9 is a view showing one example of circuit configuration of the ripple generator shown in FIG. 1.

FIG. 9 is a view showing one example of a circuit configuration of ripple generator 20 shown in FIG. 1. Referring to FIG. 9, ripple generator 20 includes semiconductor switching elements for electric power (hereinafter, also referred to simply "switching element") Q1, Q2, diodes D1, D2, a reactor L1, and a capacitor CH.

Switching elements Q1, Q2 are connected in series between a positive electrode line PL2 and a negative electrode line NL connected to a negative electrode of secondary battery 10. And a collector of switching element Q1 is connected to positive electrode line PL2, and an emitter of switching element Q2 is connected to negative electrode line NL. Diodes D1, D2 are respectively connected anti-parallel to switching elements Q1, Q2. One end of reactor L1 is connected to a positive electrode line PL1 that is connected to a positive electrode of secondary battery 10, and the other end is connected to a connection node ND of switching elements Q1, Q2. Capacitor CH is connected between positive electrode line PL2 and negative electrode line NL.

As switching elements Q1, Q2 as described above, for example, IGBT (Insulated Gate Bipolar Transistor), MOS (Metal Oxide Semiconductor) transistor for electric power and the like may be used.

Ripple generator 20 generates a ripple current IB corresponding to a switching frequency of switching elements Q1, Q2 in secondary battery 10 by complementary ON/OFF of switching elements Q1, Q2 according to a control signal PWMC from controller 30. Concretely, assuming ripple current IB in the direction of charging of secondary battery 10 to be positive, when switching elements Q1, Q2 are in OFF and ON states, respectively, ripple current IB increases in the negative direction. When ripple current IB is negative, and then switching elements Q1, Q2 change to ON and OFF states, respectively, ripple current IB starts increasing in the positive direction. Then ripple current IB becomes positive, and when switching elements Q1, Q2 switch to OFF and ON states, respectively, ripple current IB starts increasing in the negative direction. In this manner, it is possible to generate ripple current IB in secondary battery 10 depending on the switching frequency of switching elements Q1, Q2.

Figure 10:
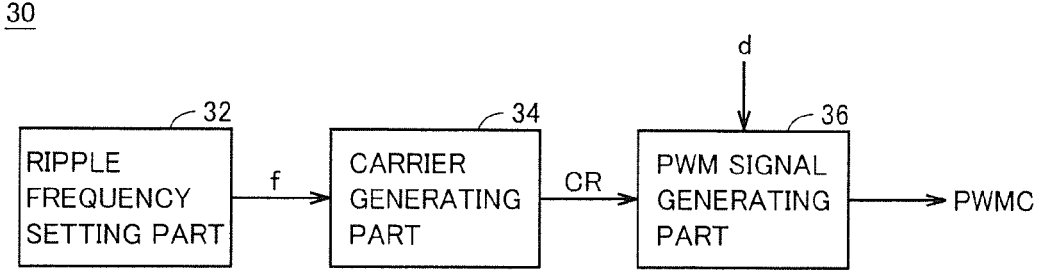
FIG. 10 is a functional block diagram of a controller.

FIG. 10 is a functional block diagram of controller 30. Referring to FIG. 10, controller 30 includes a ripple frequency setting part 32, a carrier generating part 34, and a PWM (Pulse Width Modulation) signal generating part 36. Ripple frequency setting part 32 sets the switching frequency of switching elements Q1, Q2 of ripple generator 20, namely the frequency f of ripple current to be generated in secondary battery 10 (hereinafter, also referred to "ripple frequency"). Concretely, ripple frequency setting part 32 sets a frequency where an absolute value of the impedance of secondary battery 10 is relatively small (for example, around 1 kHz) as ripple frequency f, based on the frequency characteristics of the impedance of secondary battery 10 shown in FIGS. 3 to 5, and outputs set ripple frequency f to carrier generating part 34.

Carrier generating part 34 generates carrier signal CR (triangle wave) having ripple frequency f received from ripple frequency setting part 32, and outputs carrier signal CR thus generated to a PWM signal generating part 36.

PWM signal generating part 36 compares magnitude of a predetermined duty command value d (assuming 0.5) with that of carrier signal CR received from carrier generating part 34, and generates a PWM signal whose logical state varies depending on the comparison result. PWM signal generating part 36 outputs the generated PWM signal to switching elements Q1, Q2 of ripple generator 20 as control signal PWMC.

Figure 11:
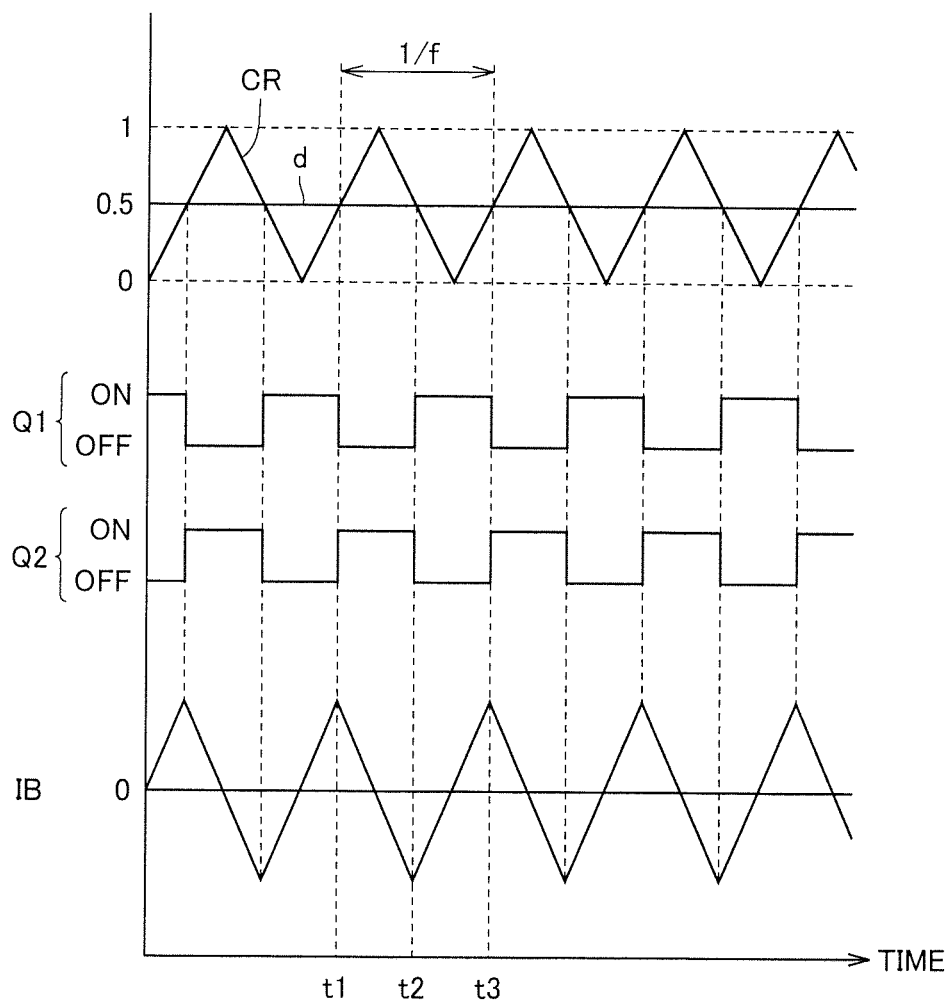
FIG. 11 is a view showing behavior of ripple current.

FIG. 11 is a view showing a behavior of ripple current IB. Referring to FIG. 11, for example, at time t1, when carrier signal CR is larger than duty command value d (=0.5), switching element Q1 of an upper arm is turned OFF, and switching element Q2 of a lower arm is turned ON. As a result, ripple current IB (FIG. 9) changes to increase in the negative direction, and the sign of ripple current IB switches from positive to negative in the timing that energy accumulated in reactor L1 (FIG. 9) is discharged.

At time t2, when carrier signal CR is smaller than duty command value d, switching element Q1 of the upper arm is turned ON, and switching element Q2 of the lower arm is turned OFF. As a result, ripple current IB changes to increase in the positive direction, and the sign of ripple current IB switches from negative to positive in the timing that energy accumulated in reactor L1 is discharged.

At time t3, when carrier signal CR becomes larger than duty command value d again, switching elements Q1, Q2 are respectively turned OFF and ON, and ripple current IB again changes to increase in the negative direction.

In this manner, it is possible to generate ripple current IB having a frequency of carrier signal CR, namely ripple frequency fin secondary battery 10.

As described above, in the first embodiment, by actively generating a ripple current in secondary battery 10 by ripple generator 20, the temperature of secondary battery 10 is elevated from inside. Here, since the ripple frequency is set at a frequency in the frequency region where an absolute value of the impedance of secondary battery 10 relatively decreases based on frequency characteristics of the impedance of secondary battery 10 (for example, around 1 kHz), it is possible to make a current sufficient for heat generation flow in the battery while keeping the upper and the lower limit voltages even under an extremely low temperature. Therefore, according to the first embodiment, it is possible to effectively elevate the temperature of secondary battery 10 by effectively allowing heat generation in secondary battery 10 from inside.

Also according to the first embodiment, when ripple generator 20 is embodied by a circuit as shown in FIG. 9, energy source for elevating the temperature of secondary battery 10 is only secondary battery 10 (no additional power source is required), so that the temperature of secondary battery 10 can be effectively increased.

Further, according to the first embodiment, since heat is generated from inside secondary battery 10 utilizing heat generation of internal resistance of secondary battery 10, nonuniformity in heating that can occur in heating from outside the battery using a heater or the like does not occur. Since the lower the temperature, the larger internal resistance of a battery, and a cell with lower temperature among serially connected cells has a larger calorific value, it is possible to elevate a temperature of battery uniformly.

Second Embodiment

In the second embodiment, when secondary battery 10 is a lithium ion battery and deposition of lithium (Li) in a negative electrode by a ripple current in the charging direction is problematic, a ripple frequency is set to avoid occurrence of Li deposition. In the following, the concept of the ripple frequency in the second embodiment will be described.

Figure 12:
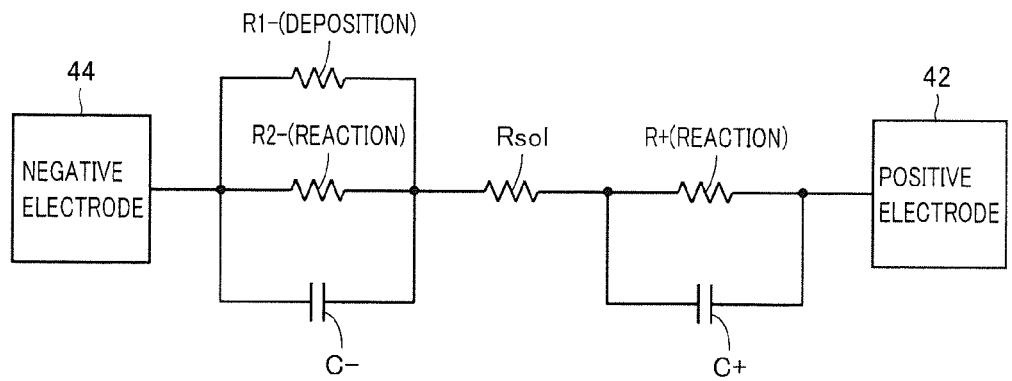
FIG. 12 is an equivalent circuit diagram of electrode/electrolytic solution interface for a secondary battery.

FIG. 12 is an equivalent circuit diagram of electrode/electrolytic solution interface for secondary battery 10. Referring to FIG. 12, internal resistance of secondary battery 10 is mainly composed of a negative electrode deposition resistance R1−, a negative electrode reaction resistance R2−, a negative electrode electric double layer capacity C−, a positive electrode reaction resistance R+, a positive electrode electric double layer capacity C+, and an electrolytic solution resistance Rso1.

Negative electrode deposition resistance R1− is charge-transfer resistance at a negative electrode 44 at the time of charging. Negative electrode reaction resistance R2− is charge-transfer resistance at a negative electrode 44 at the time of discharging. Negative electrode electric double layer capacity C− is a capacity of electric double layer formed in the interface between negative electrode 44 and the electrolytic solution. Positive electrode reaction resistance R+ is charge-transfer resistance on the side of a positive electrode 42. Positive electrode electric double layer capacity C+ is a capacity of electric double layer formed in the interface between positive electrode 42 and electrolytic solution. Electrolytic solution resistance Rso1 is resistance of the electrolytic solution, and metal resistance such as collecting foil. In negative electrode 44, for example, carbon-based, or tin alloy-based material is used.

Li deposits as the current flows in negative electrode deposition resistance R1− at the time of charging. On the other hand, when the ripple current generated in secondary battery 10 is high frequency wave, the current flows into negative electrode electric double layer capacity C−, and little flows into negative electrode deposition resistance R1−. In the second embodiment, by setting the ripple frequency to be higher than the frequency corresponding to a time constant of the RC circuit composed of negative electrode deposition resistance R1− and negative electrode electric double layer capacity C−, occurrence of Li deposition in negative electrode 44 is avoided.

Figure 13:
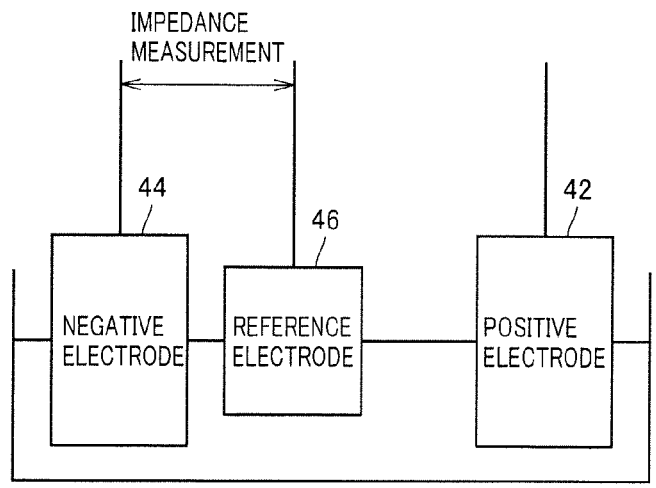
FIG. 13 is a view for illustrating a method of a measuring impedance of a negative electrode.

Negative electrode deposition resistance R1− and negative electrode electric double layer capacity C− may be measured, for example, in the following manner. That is, as shown in FIG. 13, a reference electrode 46 is provided between positive electrode 42 and negative electrode 44, and an impedance between negative electrode 44 and reference electrode 46 when a current is caused to flow between positive electrode 42 and negative electrode 44 is measured. When the measurement result is shown by a Nyquist diagram shown in FIG. 3, diameter of the semi-circle part is negative electrode deposition resistance R1−, and negative electrode electric double layer capacity C− can be determined utilizing the fact that at the vertex of the semi-circle part, the relation: (negative electrode deposition resistance R1−)×(negative electrode electric double layer capacity C−)=$1/2\pi f$ (f is frequency) is satisfied. When lithium metal is used in negative electrode 44, only deposition reaction occurs in negative electrode 44, so that by using the lithium metal in negative electrode 44, it is possible to measure negative electrode deposition resistance R1−.

Alternatively, secondary battery 10 may be disassembled, and negative electrode 44 may be provided in place of positive electrode 42, and an impedance may be measured between collecting terminals. Also in this case, by using lithium metal in both collecting terminals as described above, it is possible to calculate negative electrode deposition resistance R1−.

As described above, in the second embodiment, ripple frequency is set so that it is higher than the frequency corresponding to a time constant of RC circuit composed of negative electrode deposition resistance R1− and negative electrode electric double layer capacity C−. Therefore, according to the second embodiment, it is possible to avoid occurrence of Li deposition in a negative electrode.

Third Embodiment

In this third embodiment, when secondary battery 10 is a lithium ion battery, and deposition of lithium (Li) in a negative electrode due to a ripple current in the charging direction is problematic, the ripple current is generated in such a manner that an average value of the ripple current is offset to the discharging side.

As a concrete method, referring again to FIGS. 9 to 11, when ripple generator 20 is embodied by the circuit shown in FIG. 9, for example, duty command value d at the time of a ripple temperature elevation may be set to be smaller than 0.5. Alternatively, when ripple generator 20 is embodied by the circuit shown in FIG. 9, energy source required for the ripple temperature elevation is only secondary battery 10. Even when duty command value d at the time of the ripple temperature elevation is set at 0.5, the ripple current offsets to the discharging side only by the loss in ripple generator 20. Thus, this may be used.

As described above, even with the third embodiment, it is possible to avoid occurrence of Li deposition in a negative electrode.

Fourth Embodiment

In this fourth embodiment, the temperature elevating apparatus of the secondary battery according to the present invention is applied to an electrically-driven vehicle.

Figure 14:
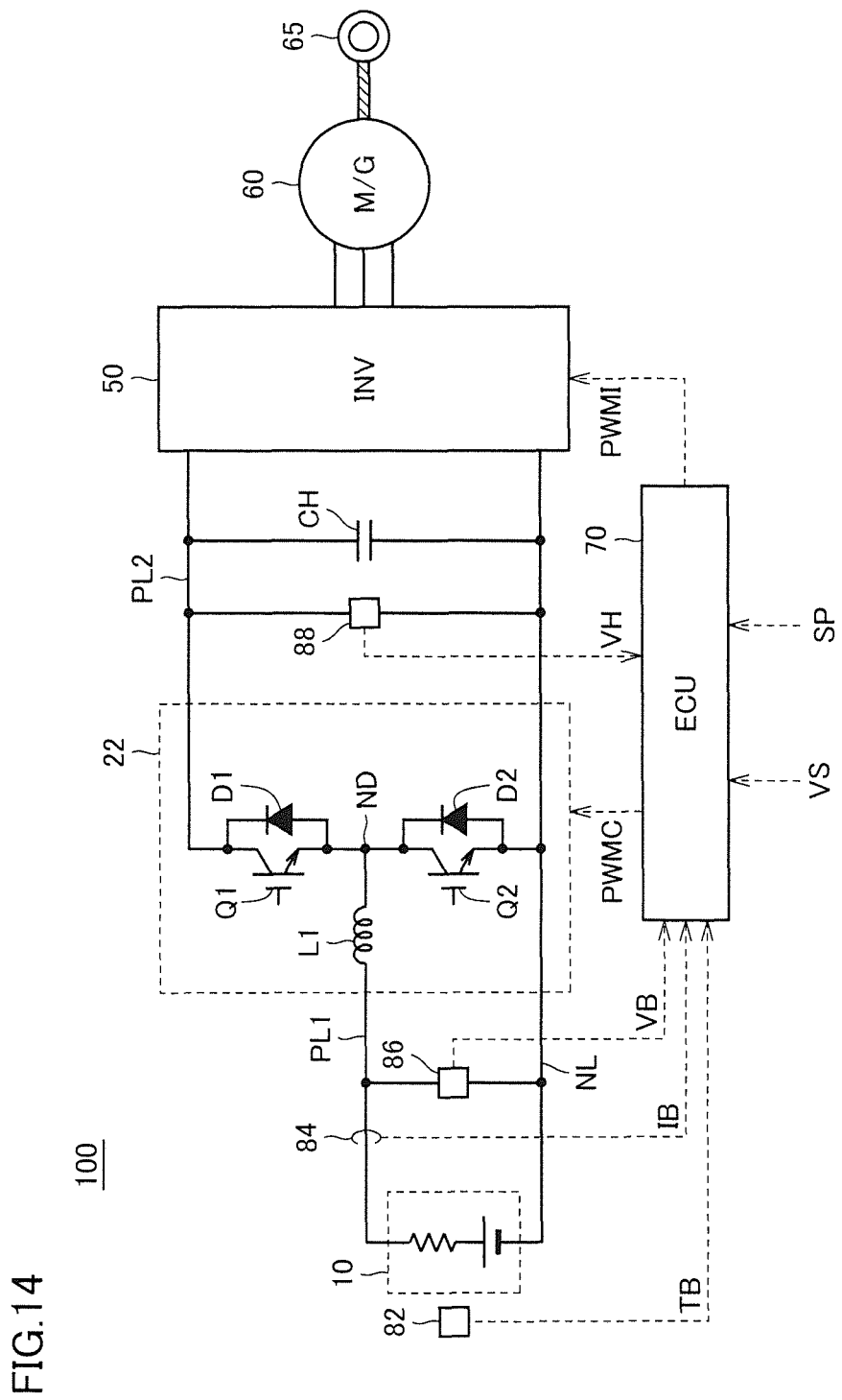
FIG. 14 is a general block diagram of an electrically-driven vehicle to which a temperature elevating apparatus of a secondary battery according to a fourth embodiment of the present invention is applied.

FIG. 14 is a general block diagram of an electrically-driven vehicle to which the temperature elevating apparatus of the secondary battery according to the fourth embodiment of the present invention is applied. Referring to FIG. 14, an electrically-driven vehicle 100 includes secondary battery 10, a boosting converter 22, capacitor CH, an inverter 50, a motor generator 60, and a drive wheel 65. Electrically-driven vehicle 100 further includes an ECU (Electronic Control Unit) 70, a temperature sensor 82, a current sensor 84, and voltage sensors 86, 88.

Boosting converter 22 is able to elevate a voltage between positive electrode line PL2 and negative electrode line NL (hereinafter, also referred to as "system voltage") to output a voltage of secondary battery 10 or higher, based on control signal PWMC from an ECU 70. When the system voltage is lower than a target voltage, it is possible to make a current flow from positive electrode line PL1 to positive electrode line PL2 and to elevate the system voltage by increasing on duty of switching element Q2. On the other hand, when the system voltage is higher than the target voltage, it is possible to make a current flow from positive electrode line PL2 to positive electrode line PL1 and to lower the system voltage by increasing on duty of switching element Q1.

Boosting converter 22 forms ripple generator 20 shown in FIG. 9 together with capacitor CH. When a predetermined ripple temperature elevation start condition is established, boosting converter 22 causes secondary battery 10 to generate a ripple current by turning ON/OFF switching elements Q1, Q2 based on control signal PWMC from ECU 70.

Capacitor CH smoothens the voltage between positive electrode line PL2 and negative electrode line NL. Capacitor CH is also used as an electric power buffer that temporarily accumulates electric power discharged from secondary battery 10 at the time of executing the ripple temperature elevation of secondary battery 10.

Inverter 50 converts DC power supplied from positive electrode line PL2 and negative electrode line NL into three-phase alternating current based on control signal PWMI from ECU 70 and outputs it to motor generator 60 to drive motor generator 60. Inverter 50 converts three-phase AC power generated by motor generator 60 at the time of braking of the vehicle into direct current based on control signal PWMI, and outputs it to positive electrode line PL2 and negative electrode line NL.

Motor generator 60 is an AC electric motor, and for example, a three-phase AC motor having a rotor embedded with a permanent magnet. Motor generator 60 is mechanically coupled with drive wheel 65 and generates torque for driving the vehicle. Also, motor generator 60 generates power by receiving motion energy of the vehicle from drive wheel 65 at the time of braking of the vehicle.

Temperature sensor 82 detects a temperature TB of secondary battery 10, and outputs the detected value to ECU 70. Current sensor 84 detects current IB inputted/outputted to/from secondary battery 10, and outputs the detected value to ECU 70. Voltage sensor 86 detects a voltage VB between positive electrode line PL1 and negative electrode line NL corresponding to output voltage of secondary battery 10, and outputs the detected value to ECU 70. Voltage sensor 88 detects a voltage VH between positive electrode line PL2 and negative electrode line NL, and outputs the detected value to ECU 70.

ECU 70 generates control signal PWMC for driving boosting converter 22 based on respective detected values of voltages VB, VH from voltage sensors 86, 88, and outputs control signal PWMC thus generated to boosting converter 22.

Also, ECU 70 determines whether a condition for executing the ripple temperature elevation of secondary battery 10 is established, based on temperature TB from temperature sensor 82, a remaining capacity of secondary battery 10 (hereinafter, also referred to as "SOC (State of Charge)"), a vehicle speed signal VS indicating speed of the vehicle, a shift position signal SP indicating a shift position of a shift lever that is not depicted, and so on. When the condition for executing the ripple temperature elevation is established, ECU 70 generates control signal PWMC for generating a ripple current of the frequency region where an absolute value of the impedance of secondary battery 10 is relatively small (for example, around 1 kHz) in secondary battery 10, and outputs control signal PWMC thus generated to boosting converter 22.

Also, ECU 70 generates control signal PWMI for driving motor generator 60, and outputs control signal PWMI thus generated to inverter 50.

Figure 15:
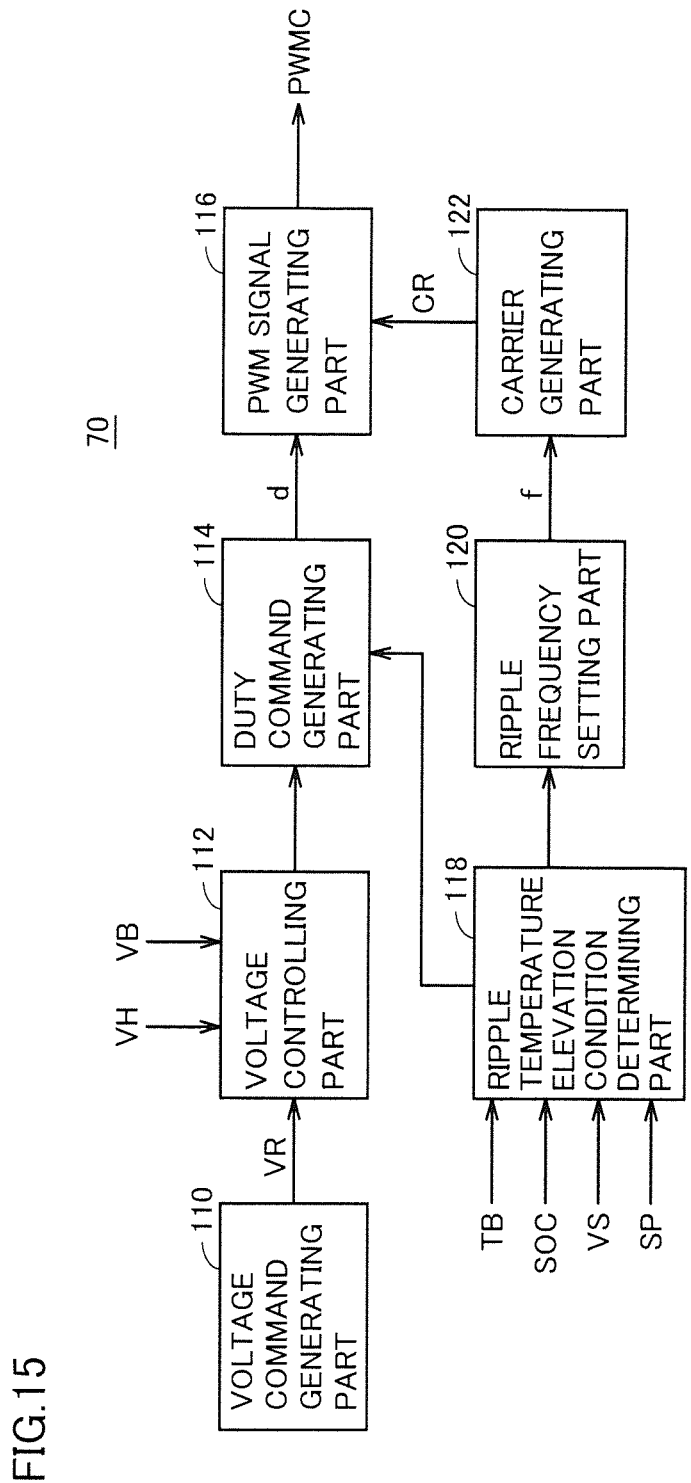
FIG. 15 is a functional block diagram of a part concerning control of a boosting converter of an ECU shown in FIG. 14.

FIG. 15 is a functional block diagram of a part concerning the control of boosting converter 22 in ECU 70 shown in FIG. 14. Referring to FIG. 15, ECU 70 includes a voltage command generating part 110, a voltage controlling part 112, a duty command generating part 114, a PWM signal generating part 116, a ripple temperature elevation condition determining part 118, a ripple frequency setting part 120, and a carrier generating part 122.

Voltage command generating part 110 generates a voltage command value VR indicating a target value of voltage VH adjusted by boosting converter 22. For example, voltage command generating part 110 generates voltage command value VR based on a torque command value of motor generator 60 and power of motor generator 60 calculated from motor revolution number.

Voltage controlling part 112 receives voltage command value VR from voltage command generating part 110 and receives detected values of voltages VH, VB respectively from voltage sensors 88, 86. Voltage controlling part 112 then executes control operation (for example proportional integral control) for making voltage VH coincidence with voltage command value VR.

Duty command generating part 114 generates duty command value d indicating switching duty of switching elements Q1, Q2 of boosting converter 22 based on control output from voltage controlling part 112. Here, upon reception of a notification of executing the ripple temperature elevation of secondary battery 10 from ripple temperature elevation condition determining part 118, duty command generating part 114 sets duty command value d at a predetermined value for the ripple temperature elevation (for example, 0.5 (boosting ratio 2)) regardless of the control output from voltage controlling part 112.

PWM signal generating part 116 compares magnitude of duty command value d received from duty command generating part 114, with that of carrier signal CR received from carrier generating part 122, and generates control signal PWMC whose logic condition varies depending on the comparison result. Then PWM signal generating part 116 outputs control signal PWMC thus generated to switching elements Q1, Q2 of boosting converter 22.

Ripple temperature elevation condition determining part 118 receives temperature TB detected by temperature sensor 82, SOC of secondary battery 10, vehicle speed VS and shift position signal SP. SOC of secondary battery 10 is calculated based on detected values of current IB and voltage VB and the like by various known methods. Then, ripple temperature elevation condition determining part 118 determines a condition of executing the ripple temperature elevation of secondary battery 10, more specifically a start condition, a continuation condition and an end condition based on the above signals, and notifies duty command generating part 114 and ripple frequency setting part 120 of whether the ripple temperature elevation is executed or not based on these determination results.

Upon receiving notification of executing the ripple temperature elevation of secondary battery 10 from ripple temperature elevation condition determining part 118, ripple frequency setting part 120 outputs ripple frequency f (frequency described in the first and the second embodiments) to carrier generating part 122.

Carrier generating part 122 generates carrier signal CR (triangle wave) for generating PWM signal in PWM signal generating part 116, and outputs carrier signal CR thus generated to PWM signal generating part 116. Here, upon receiving ripple frequency f from ripple frequency setting part 120, carrier generating part 122 generates carrier signal CR having the received ripple frequency f and outputs it to PWM signal generating part 116.

Figure 16:
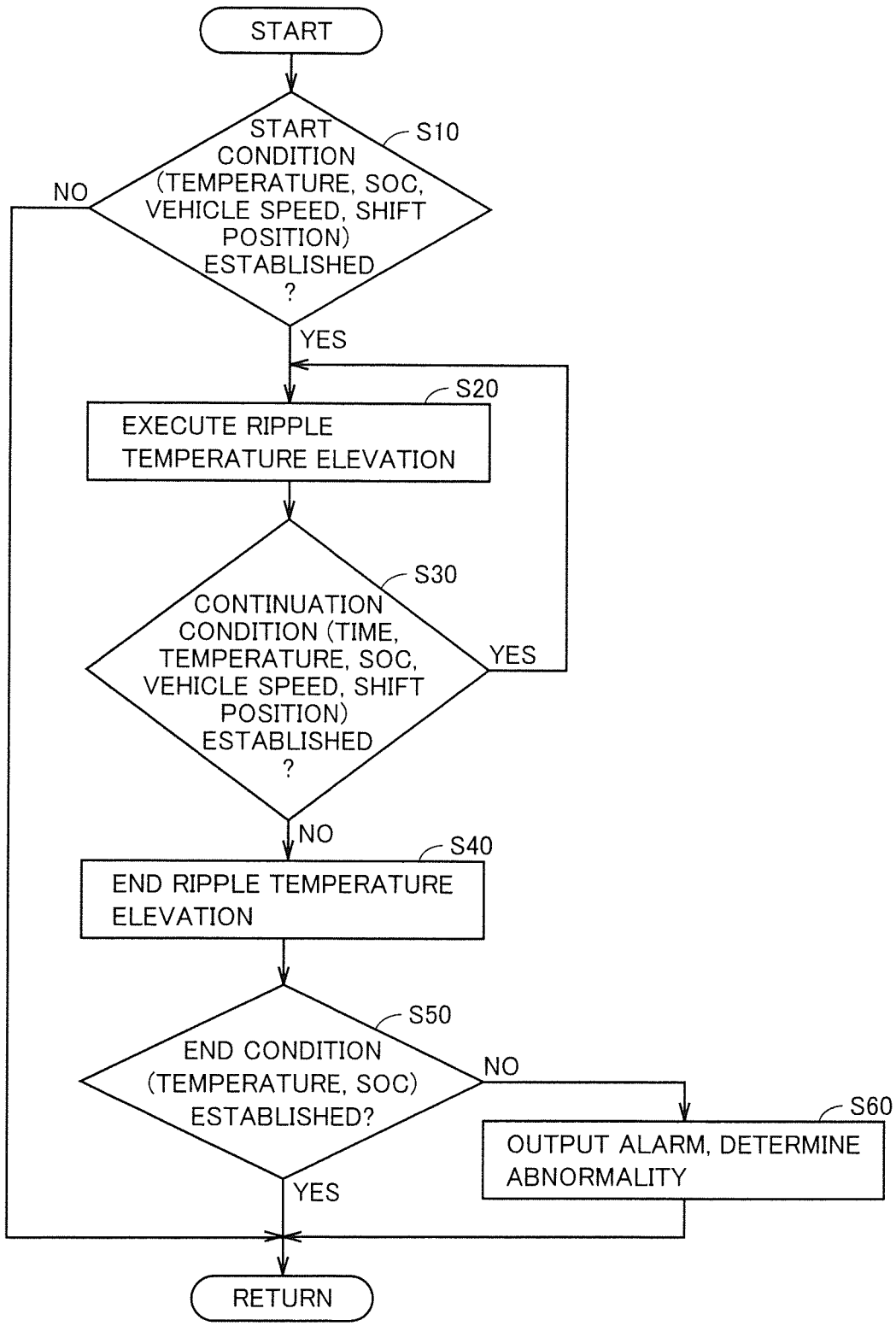
FIG. 16 is a flowchart for illustrating a process procedure of a ripple temperature elevation executed by the ECU.

FIG. 16 is a flowchart for illustrating a processing procedure of the ripple temperature elevation executed by ECU 70. The process shown in this flowchart is invoked from a main routine and executed every certain time or each time a predetermined condition is established.

Referring to FIG. 16, ECU 70 determines whether the start condition of the ripple temperature elevation is established based on temperature TB of secondary battery 10, SOC, vehicle speed signal VS, shift position signal SP and so on (Step S10). As one example, when temperature TB shows an extremely low temperature, SOC is higher than a predetermined value, vehicle speed signal VS shows a stop of vehicle, and shift position signal SP shows parking position, it is determined that the start condition of the ripple temperature elevation is established.

When it is determined that the start condition is established in Step S10 (Yes in Step S10), ECU 70 executes the ripple temperature elevation in the manner as described above (Step S20). Next, ECU 70 determines whether the continuation condition of the ripple temperature elevation is established based on a time from starting of the ripple temperature elevation, temperature TB of secondary battery 10, SOC, vehicle speed signal VS, shift position signal SP and so on (Step S30). As one example, when temperature TB is lower than a predetermined temperature-elevation end temperature, SOC is higher than a predetermined value, vehicle speed signal VS shows a stop of vehicle, shift position signal SP shows a parking position, and a time from starting of the ripple temperature elevation is not longer than a predetermined time, it is determined that the continuation condition of the ripple temperature elevation is established. And, when it is determined that the continuation condition is established (Yes in Step S30), the process proceeds to Step S20, and the ripple temperature elevation is continued.

In Step S30, when it is determined that the continuation condition is not established (No in Step S30), ECU 70 ends the ripple temperature elevation (Step S40). Next, ECU 70 determines the end condition of the ripple temperature elevation, based on the ripple temperature elevation temperature TB of secondary battery 10, SOC and so on (Step S50). As one example, when temperature TB is more than a predetermined temperature-elevation end temperature or SOC is less than a lower limit, it is determined that the end condition is established.

When it is determined that the end condition is established in Step S50, (YES in Step S50), a series of processes end. On the other hand, when it is determined that the end condition is not established in Step S50 (No in Step S50), an alarm is outputted, and a predetermined abnormality determining process is executed (Step S60).

Figure 17:
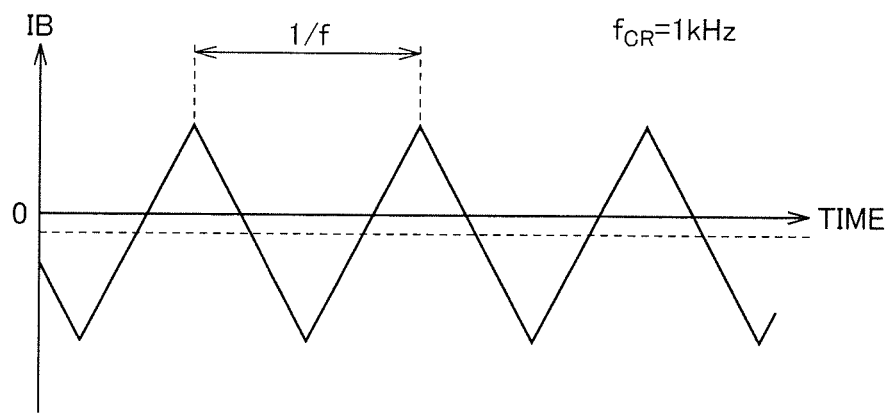
FIG. 17 is a waveform diagram of an electric current at the time of a ripple temperature elevation of a secondary battery.

FIG. 17 is a waveform diagram of current IB at the time of the ripple temperature elevation of secondary battery 10. Here, when charging current flows into secondary battery 10, current IB is taken as positive. Referring to FIG. 17, at the time of the ripple temperature elevation, since a carrier frequency fCR of boosting converter 22 is set at ripple frequency f (set at 1 kHz), current IB varies with ripple frequency f.

Since energy source for generating the ripple current is only secondary battery 10, current IB offsets in the negative direction (discharging direction) due to a loss or the like in boosting converter 22. As a result, when secondary battery 10 is a lithium ion battery, occurrence of Li deposition in negative electrode accompanying the ripple temperature elevation is avoided.

While a switching frequency at the time of normal boosting operation of boosting converter 22 (at the time of a non-ripple temperature elevation) is about several kHz to 10 kHz, ripple frequency fat the time of the ripple temperature elevation is about 1 kHz, and thus is lower than the switching frequency at the time of normal operation. That is, at the time of the ripple temperature elevation, ECU 70 sets the switching frequency of boosting converter 22 (or carrier frequency) lower than that at the time of normal operation (at the time of the non-ripple temperature elevation).

Figure 18:
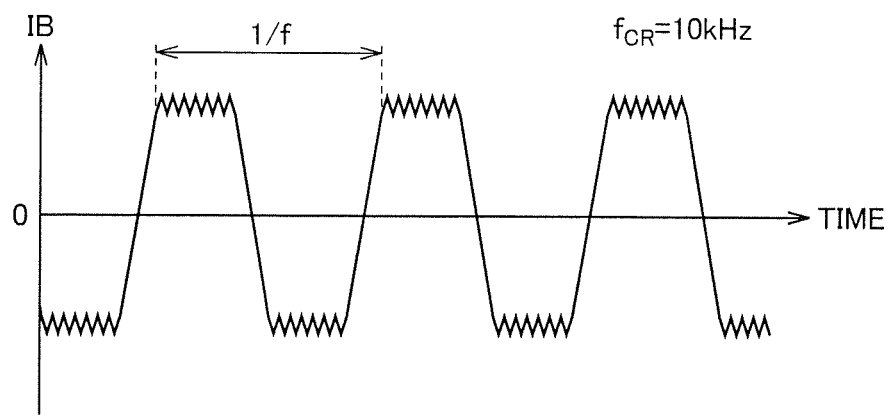
FIG. 18 is a view showing other method of generating a ripple current.

In the above, while the ripple current is generated by changing carrier frequency fCR of boosting converter 22 to ripple frequency f, the ripple current as shown in FIG. 18 may be generated by giving a current command that turns to AC at changes ripple frequency f without changing carrier frequency fCR (for example, 10 kHz).

As described above, in the fourth embodiment, the ripple temperature elevation of secondary battery 10 is executed using boosting converter 22. Therefore, according to the fourth embodiment, it is possible to realize a temperature elevating apparatus of secondary battery 10 capable of effectively the elevating temperature of secondary battery 10 by effectively generating heat in secondary battery 10 from inside, without inhibiting miniaturization and a cost reduction of the vehicle driving apparatus and the vehicle itself.

Fifth Embodiment

Referring again to FIG. 14, when the ripple temperature elevation of secondary battery 10 using boosting converter 22 is conducted, a peak value Ip of the generated ripple current (triangle wave) is represented by the following formula taking a duty ratio of switching elements Q1, Q2 as 0.5 (boosting ratio 2):

$$Ip = VB/L \times 1/(4 \times f) \quad (6)$$

Here, L represents an inductance of reactor L1, and f represents switching frequency (=ripple frequency, carrier frequency) of boosting converter 22.

Figure 19:
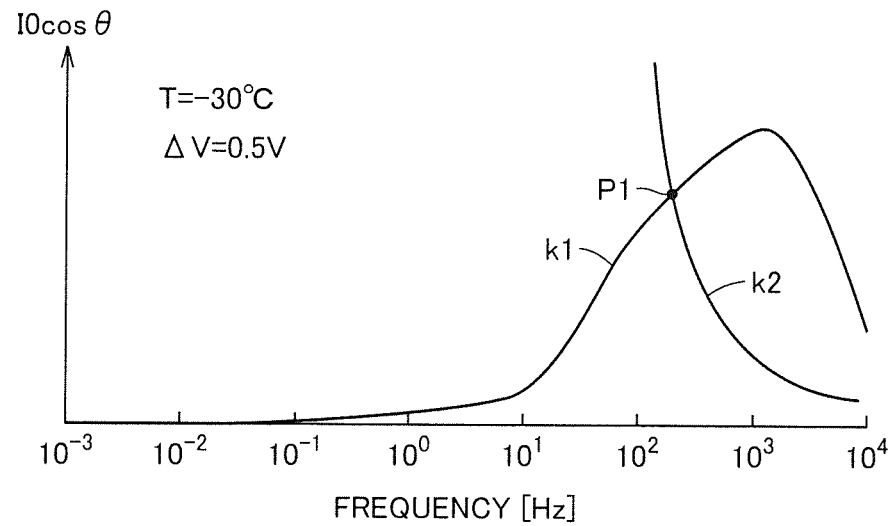
FIG. 19 is a view in which peak value of ripple current is superposed on FIG. 8 showing a current Jocose which is in proportional to a calorific value.

FIG. 19 is a view in which peak value Ip of the ripple current is superposed on FIG. 8 showing a current Iocose that is in proportional to calorific value. Referring to FIG. 19, a curve k1 represents current I0 cos θ that is in proportional to a calorific value, and a curve k2 represents peak value Ip represented by Formula (6). In other words, curve k1 represents a maximum current seen from secondary battery 10, and curve k2 represents a maximum current seen from reactor L1. When magnitude of the current exceeds curve k1, a voltage that exceeds the upper and the lower limit voltages occurs, so that it is impossible to make the current exceeding curve k1 flow. On the other hand, the current that can be made flow in reactor L1 is shown by curve k2. By selecting the ripple frequency corresponding to an intersection point P1 of curves k1, k2, it is possible to maximize the calorific value of secondary battery 10 while keeping the upper and the lower limit voltages of secondary battery 10.

As described above, according to the fifth embodiment, when existent boosting converter 22 is used, calorific value of secondary battery 10 by the ripple temperature elevation can be maximized.

Sixth Embodiment

Referring again to FIG. 19, since intersection point P1 is not a maximum point of curve k1, an inductance L of reactor L1 of boosting converter 22 is not said to be optimum from the view point of appropriately executing the ripple temperature elevation of secondary battery 10 in the fifth embodiment. Since the maximum current that can be made flow in reactor L1 of boosting converter 22 is represented by the above Formula (6), it is possible to maximize the ripple current occurring in secondary battery 10 by designing inductance L of reactor L1 of boosting converter 22 in an appropriate manner.

Figure 20:
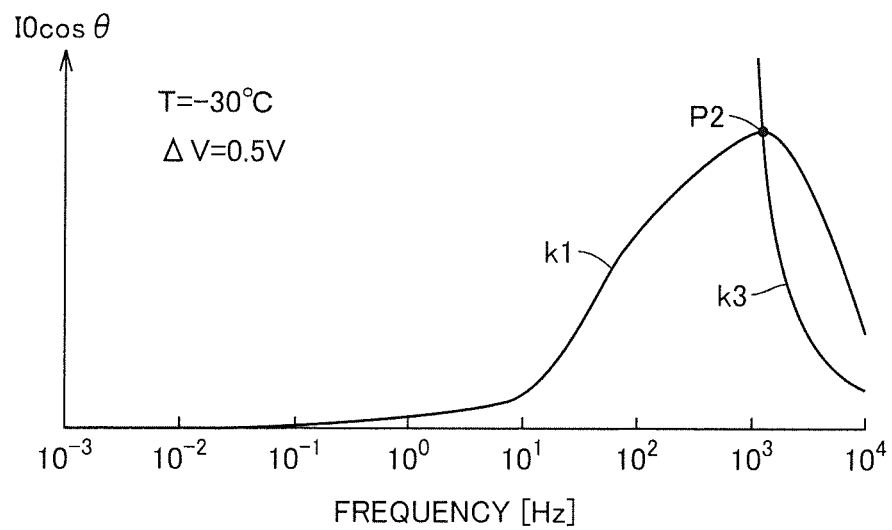
FIG. 20 is a view for illustrating a method of designing an inductance of a reactor for maximizing a ripple current to be generated in the secondary battery.

FIG. 20 is a view for illustrating a designing method of the inductance of reactor L1 for maximizing the ripple current to be made occurring in secondary battery 10. Referring to FIG. 20, a curve k3 represents peak value Ip of the ripple current shown in Formula (6). In the sixth embodiment, inductance L of reactor L1 is designed so that curve k3 intersects with curve k1 at a maximum point P2 of curve k1 representing current I0 cos θ that is proportional to a calorific value. Comparing with the fifth embodiment, in the sixth embodiment, boosting converter 22 is designed so that inductance L of reactor L1 is smaller than that in the fifth embodiment.

As described above, according to the sixth embodiment, by designing inductance L of reactor L1 of boosting converter 22 in an appropriate manner, it is possible to maximize the ripple current occurring in secondary battery 10.

Seventh Embodiment

As described above, when the ripple temperature elevation of secondary battery 10 is executed using boosting converter 22, if a carrier frequency of boosting converter 22 (switching frequency of switching element Q1, Q2) is set lower than that at the time of the normal boosting operation (set at 1 kHz, for example), noise due to the current will increase, and acoustic noise will be problematic as the occurring noise enters the audible zone. Also in the aspect of the efficiency, loss in reactor L1 at the time of the ripple temperature elevation is problematic.

In the seventh embodiment, a reactor for the ripple temperature elevation is provided separately in the boosting converter. In this reactor for the ripple temperature elevation, an inductance is designed so that a sufficient ripple current is obtained even when the carrier frequency of boosting converter 22 is kept at a high frequency same as that at the time of the normal operation.

Figure 21:
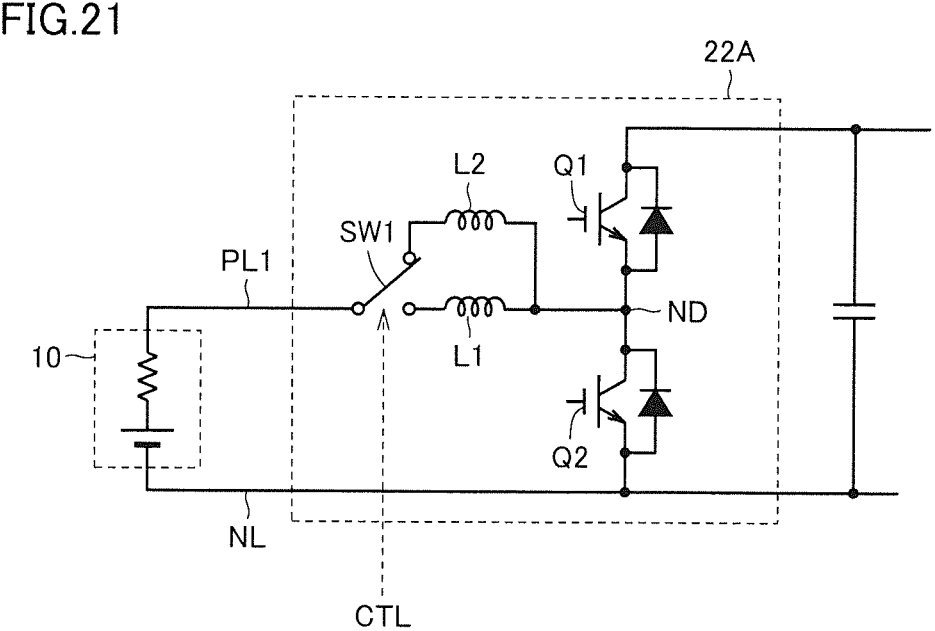
FIG. 21 is a circuit diagram of a boosting converter in a seventh embodiment.

FIG. 21 is a circuit diagram of a boosting converter in a seventh embodiment. Other configuration than the boosting converter is identical to the configuration shown in FIG. 14. Referring to FIG. 21, a boosting converter 22A further includes a reactor L2 and a switch SW1 in the configuration of boosting converter 22 shown in FIG. 14.

Reactor L2 is provided parallel with reactor L1. Reactor L2 is a reactor for the ripple temperature elevation, and is designed to have smaller inductance than reactor L1 for the normal boosting operation. For example, at the time of the ripple temperature elevation, when it is intended to generate a ripple current that is ten times the current ripple occurring at the time of normal operation using reactor L1, an inductance of reactor L1 for the ripple temperature elevation can be set at one-tenth of the inductance of reactor L1.

Considering a low inductance and improvement of efficiency, it is preferred to use a hollow coil as reactor L2. By using the hollow coil, loss (iron loss) by the reactor is reduced, and the efficiency can be improved.

Switch SW1 is provided between reactors L1, L2 and positive electrode line PL1. Switch SW1 electrically connects positive electrode line PL1 to either one of reactors L1, L2 according to a switching signal CTL from ECU 70 that is not depicted. Other configuration of boosting converter 22A is as same as boosting converter 22 shown in FIG. 14.

In boosting converter 22A, at the time of the normal boosting operation (non-ripple temperature elevation), reactor L1 is connected to positive electrode line PL1 by switch SW1, and reactor L2 is disconnected from positive electrode line PL1 according to switching signal CTL from ECU 70. On the other hand, at the time of the ripple temperature elevation, reactor L2 is connected to positive electrode line PL1, and reactor L1 is disconnected from positive electrode line PL1 by switch SW1 according to switching signal CTL. A switching frequency (carrier frequency of boosting converter 22A) of switching elements Q1, Q2 at the time of the ripple temperature elevation is equal to that at the time of the boosting operation (for example, about several kHz to 10 kHz).

As described above, in the seventh embodiment, since reactor L2 for the ripple temperature elevation is provided so that reaction L1 for normal operation is switched to reactor L2 at the time of the ripple temperature elevation, it is not necessary to set the switching frequency of boosting converter 22 (carrier frequency of boosting converter 22A) low at the time of the ripple temperature elevation. Therefore, according to the seventh embodiment, it is possible to prevent the noise from increasing in association with the ripple temperature elevation.

Further, by using a hollow coil as reactor L2 of the ripple temperature elevation, loss (iron loss) by the reactor is reduced at the time of the ripple temperature elevation, and the efficiency of the ripple temperature elevation improves.

Modified Example

As described above, since an inductance of reactor L2 for the ripple temperature elevation is smaller than that of inductance of existent reactor L1, reactor L1 may be constantly connected to positive electrode line PL1, and reactor L2 may be electrically connected to reactor L1 in parallel at the time of the ripple temperature elevation.

Figure 22:
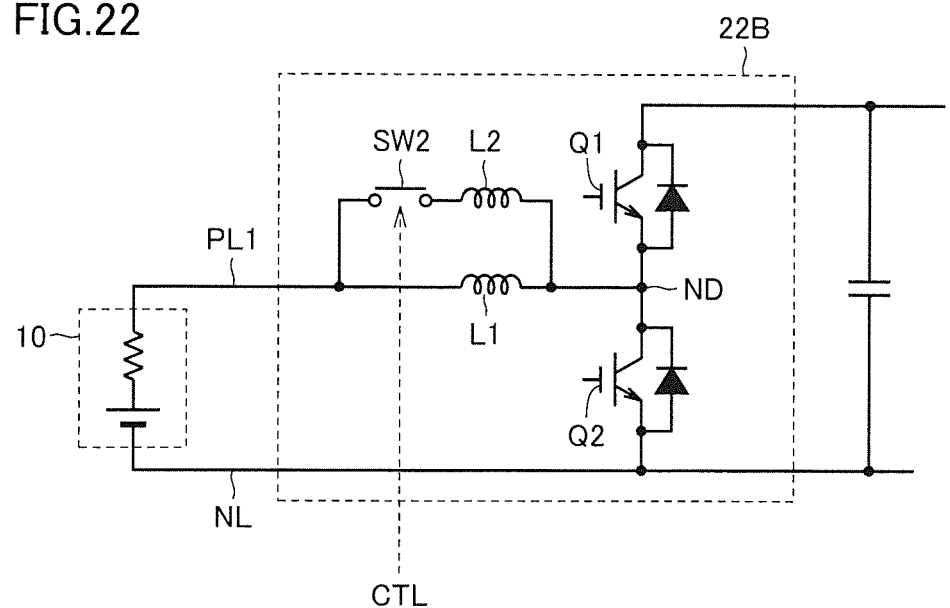
FIG. 22 is a circuit diagram of a boosting converter in a modified example of the seventh embodiment.

FIG. 22 is a circuit diagram of a boosting converter in a modified example of the seventh embodiment. Referring to FIG. 22, a boosting converter 22B includes a switch SW2 in place of switch SW1 in the configuration of boosting converter 22A shown in FIG. 21.

Switch SW2 is provided between reactor L2 and positive electrode line PL1. Switch SW2 is turned ON/OFF according to switching signal CTL from ECU 70 that is not depicted. Reactor L1 is directly connected to positive electrode line PL1. Other configuration of boosting converter 22B is the same as that of boosting converter 22A shown in FIG. 21.

In boosting converter 22B, at the time of the normal boosting operation (at the time of non-ripple temperature elevation), Switch SW2 is turned OFF according to switching signal CTL from ECU 70 and reactor L2 is disconnected from positive electrode line PL1. On the other hand, at the time of the ripple temperature elevation, switch SW2 is turned ON according to switching signal CTL, and reactor L2 is connected to positive electrode line PL1. Since inductance of reactor L2 is smaller than that of reactor L1, with such a configuration, it is possible to obtain similar characteristics to those of the seventh embodiment at the time of the ripple temperature elevation.

Eighth Embodiment

Figure 23:
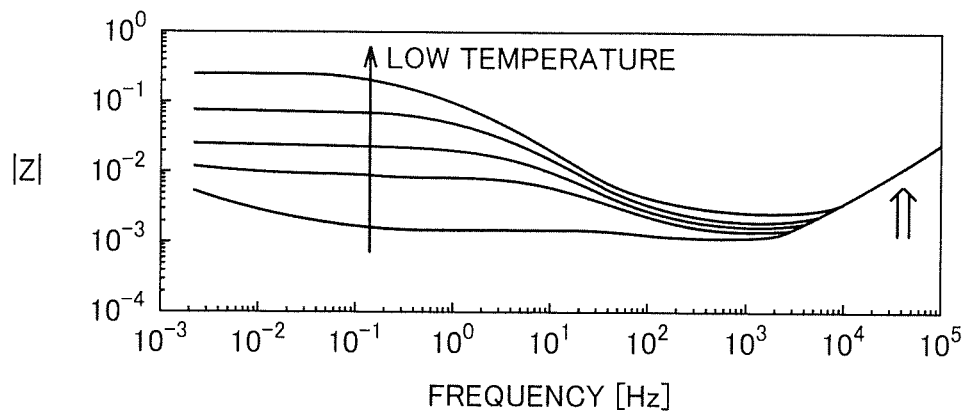
FIG. 23 is a Bode diagram showing impedance characteristics (absolute value) of a secondary battery.
Figure 24:
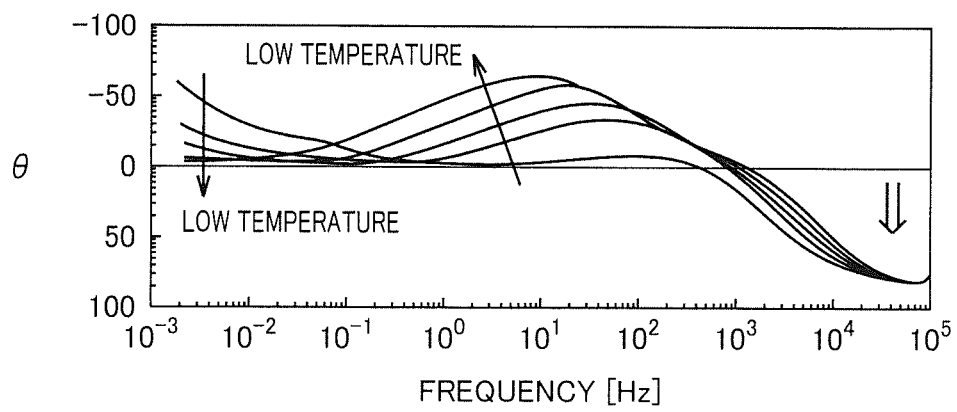
FIG. 24 is a Bode diagram showing impedance characteristics (phase) of a secondary battery.

FIG. 23 and FIG. 24 are Bode diagrams showing impedance characteristics of secondary battery 10. Referring to FIG. 23 and FIG. 24, in the seventh embodiment and modified embodiment thereof, while a frequency of the ripple current (ripple frequency) to be generated in secondary battery 10 at the time of the ripple temperature elevation is, for example, several kHz to 10 k Hz which is the same as that at the time of the normal boosting operation, absolute value |Z| of impedance Z of secondary battery 10 increases, and phase θ also increases in a high frequency region exceeding several kHz as shown by arrows in FIGS. 23 and 24. Thus, increase in the impedance can result in disability to sufficiently flow the ripple current under the restriction of upper and lower limits of the voltage of secondary battery 10 as described above.

Figure 25:
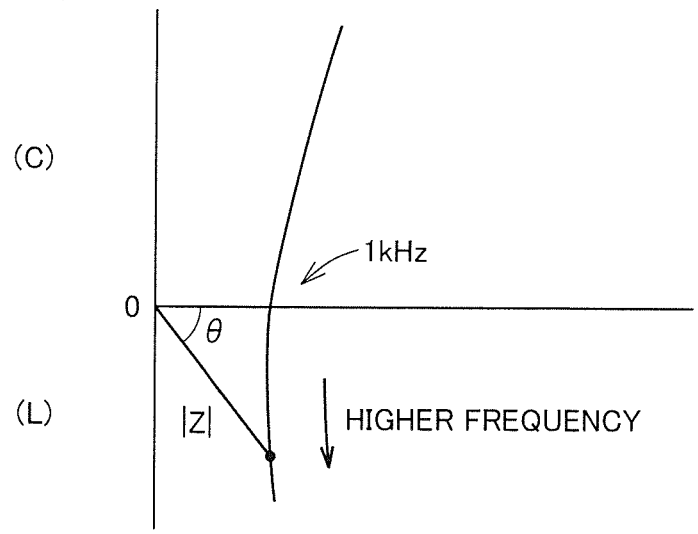
FIG. 25 is an enlarged view of the origin and its vicinity of the Nyquist diagram showing impedance characteristics of a secondary battery.

FIG. 25 is an enlarged view of the origin and its vicinity of Nyquist diagram showing impedance characteristics of secondary battery 10. Referring to FIG. 25, when frequency exceeds 1 kHz, absolute value |Z| of impedance Z of secondary battery 10 increases, and phase θ also increases, as can be seen from FIG. 25. From FIG. 25, it is also found that the increase in the impedance results from phase θ approximating to 90 degrees due to the increase in the L component, and change in a real component of the impedance is small.

Here, since the calorific value of secondary battery 10 is proportional to $I0 \times |\Delta V| \cos \theta = I0^2 \times |Z| \cos \theta$, even when the impedance increases due to the increase in the L component, the calorific value of secondary battery 10 will little change at phase θ of approximately zero, namely at around 1 kHz. That is, the increase in the impedance by the increase in the L component little contributes to increase in the calorific value of secondary battery 10, and as is already described, there is a possibility that ripple current cannot be sufficiently flown under the restriction of the upper and lower limits of the voltage of secondary battery 10 as described above.

On the other hand, the increase in the impedance by the increase in the L component in this high frequency region does not result from electrochemical characteristics of secondary battery 10 but result from a structure of secondary battery 10. In light of this, according to the eighth embodiment, an electrode structure capable of suppressing the increase in the L component in the high frequency region in secondary battery 10 is shown.

Figure 26:
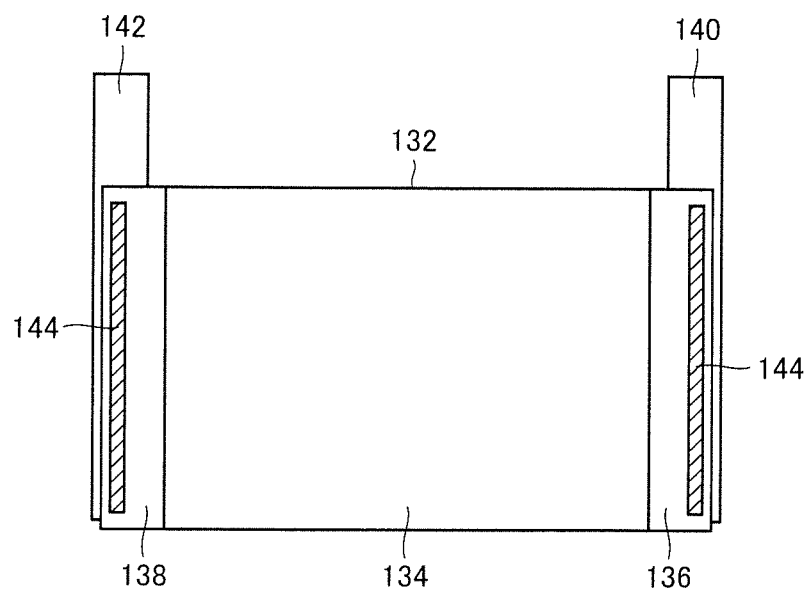
FIG. 26 is a view for illustrating a characteristic part of an electrode structure of a secondary battery in an eighth embodiment.

FIG. 26 is a view for describing a characteristic part of electrode structure of a secondary battery in the eighth embodiment. Referring to FIG. 26, an electrode body 132 of secondary battery 10 includes a main part 134, a positive electrode collecting foil part 136, a negative electrode collecting foil part 138, a positive electrode collecting terminal 140, a negative electrode collecting terminal 142, and a welding part 144.

A structural feature of secondary battery 10 lies in that each of area of welding part 144 that connects positive electrode collecting terminal 140 and positive electrode collecting foil 136, and area of welding 144 that connects negative electrode collecting terminal 142 to negative electrode collecting foil 138 is sufficiently large. By making the area of welding part 144 large, it is possible to prevent component L from increasing. For making the area of welding part 144 large, the number of welding points may be increased, as well as welding part 144 is formed in the form of line or face as shown in FIG. 26.

As a structure of electrode, a plate type structure may be employed in place of a coil structure in which a positive electrode and a negative electrode are coiled with a separator interposed therebetween.

As described above, according to the eighth embodiment, since it is possible to suppress the increase in the impedance in the high frequency region, it is possible to avoid the possibility that a sufficient ripple current cannot be flown under the restriction of the upper and lower limits of the voltage of secondary battery 10 when the configuration of the seventh embodiment and its modified example is employed.

In the above, electrically-driven vehicle 100 may be an electric vehicle having motor generator 60 as its only power source for running, or may be a hybrid vehicle further equipped with an engine as a power source for running, or may be a fuel cell vehicle further equipped with a fuel cell as a DC power source, in addition to secondary battery 10.

In the above, controller 30 and ECU 70 correspond to "controller" in the present invention, and boosting converters 22, 22A, 22B correspond to "booster" in the present invention. Switching elements Q1, Q2 correspond to "first and second switching elements" in the present invention, and reactors L1, L2 respectively correspond to "first reactor" and "second reactor" in the present invention.

It is to be understood that embodiments disclosed herein are given for exemplification and not for limitation in all aspects. Scope of the present invention is shown not by the above description of embodiments, but by claims, and it is to be intended that every modification within equivalent meaning and scope of claims is embraced.

REFERENCE SIGNS LIST 10 secondary battery, 12 internal resistance, 20 ripple generator, 22, 22A, 22B boosting converter, 30 controller, 32, 120 ripple frequency setting part, 34, 122 carrier generating part, 36, 116 PWM signal generating part, 42 positive electrode, 44 negative electrode, 46 reference electrode, 50 inverter, 60 motor generator, 65 drive wheel, 70 ECU, 82 temperature sensor, 84 current sensor, 86, 88 voltage sensor, 110 voltage command generating part, 112 voltage controlling part, 114 duty command generating part, 118 ripple temperature elevation condition determining part, 132 electrode body, 134 electrode part, 136 positive electrode collecting foil, 138 negative electrode collecting foil, 140 positive electrode collecting terminal, 142 negative electrode collecting terminal, 144 welding part, PL1, PL2 positive electrode line, NL negative electrode line, L1,L2 reactor, Q1,Q2 switching element, D1, D2 diode, CH capacitor, ND connection node, R1− negative electrode deposition resistance, R2− negative electrode reaction resistance, C− negative electrode electric double layer capacity, R+ positive electrode reaction resistance, C+ positive electrode electric double layer capacity, Rso1 electrolyte resistance, SW1, SW2 switch

The invention claimed is:

1. A temperature elevating apparatus of a secondary battery comprising:
 a ripple generator connected to a secondary battery, configured to actively generate a ripple current of a predetermined frequency in said secondary battery, and
 a controller programmed to output, to said ripple generator, a command for elevating a temperature of said secondary battery by generating the ripple current of said predetermined frequency in said secondary battery,
 wherein said predetermined frequency is set at a frequency in a frequency region where an absolute value of an impedance of said secondary battery relatively decreases, based on frequency characteristics of the impedance of said secondary battery.

2. The temperature elevating apparatus of the secondary battery according to claim 1, wherein said ripple generator is a chopper-type booster configured to be able to boost an output voltage to a voltage of said secondary battery or higher.

3. The temperature elevating apparatus of the secondary battery according to claim 2, wherein said controller is programmed to set a switching frequency of said booster at said predetermined frequency when the temperature of said secondary battery is requested to be elevated.

4. The temperature elevating apparatus of the secondary battery according to claim 2, wherein said controller is programmed to set the switching frequency of said booster at a value lower than that at the time when the temperature of said secondary battery is not elevated when the temperature of said secondary battery is requested to be elevated.

5. The temperature elevating apparatus of the secondary battery according to claim 2, wherein said booster includes:
 a first and a second switching elements connected serially between each of a pair of voltage output lines, and
 a reactor connected between a connection node of said first and second switching elements and a positive electrode of said secondary battery, having a predetermined inductance, and
 when the temperature of said secondary battery is requested to be elevated, said controller sets a switching frequency of said first and second switching elements so that said ripple current is maximized within the range not exceeding a maximum current amount of said secondary battery determined for each frequency of said ripple current by the frequency characteristics of the impedance of said secondary battery and a voltage restriction of said secondary battery.

6. The temperature elevating apparatus of the secondary battery according to claim 2, wherein said booster includes:
 a first and a second switching elements connected serially between each of a pair of voltage output lines, and
 a reactor connected between a connection node of said first and second switching elements and a positive electrode of said secondary battery, and
 an inductance of said reactor is set so that a calorific value of said secondary battery determined for each frequency of said ripple current by the frequency characteristics of the impedance of said secondary battery and a voltage restriction of said secondary battery is maximized.

7. The temperature elevating apparatus of the secondary battery according to claim 1, wherein said predetermined frequency is set at approximately 1 kHz based on the frequency characteristics of the impedance of said secondary battery.

8. The temperature elevating apparatus of the secondary battery according to claim 1, wherein
 said secondary battery is a lithium ion battery, and
 said predetermined frequency is set to be higher than a frequency corresponding to a time constant determined by a deposition resistance of a negative electrode and electric double layer capacity of said negative electrode at the time when a charging current flows in said lithium ion battery.

9. The temperature elevating apparatus of the secondary battery according to claim 1, wherein
 said secondary battery is a lithium ion battery, and
 said controller is programmed to control said ripple generator so that a ripple current in which an average value of said ripple current is offset to the discharging side of said lithium ion battery is generated in said secondary battery.

10. A vehicle comprising:
 a secondary battery for storing electric power for vehicle traveling, and
 the temperature elevating apparatus of secondary battery according to claim 1, configured to elevate the temperature of said secondary battery when the temperature of said secondary battery is requested to be elevated.

* * * * *